United States Patent
Sundararajan et al.

(10) Patent No.: US 7,603,653 B2
(45) Date of Patent: Oct. 13, 2009

(54) SYSTEM FOR MEASURING, CONTROLLING, AND VALIDATING SOFTWARE DEVELOPMENT PROJECTS

(75) Inventors: Parthasarathy Sundararajan, Tamil Nadu (IN); Srinivasan Ramaswamy, Tamil Nadu (IN); Subramanian Seetharaman, Tamil Nadu (IN); Raghuram Devalla, Tamil Nadu (IN); Kannappan Gopalswamy, Tamil Nadu (IN)

(73) Assignee: Ramco Systems Limited, Chennai, Tamil Nadu (IN)

( * ) Notice: Subject to any disclaimer, the term of this patent is extended or adjusted under 35 U.S.C. 154(b) by 828 days.

(21) Appl. No.: 11/079,748

(22) Filed: Mar. 14, 2005

(65) Prior Publication Data

US 2005/0216882 A1    Sep. 29, 2005

Related U.S. Application Data

(60) Provisional application No. 60/553,463, filed on Mar. 16, 2004, provisional application No. 60/553,270, filed on Mar. 15, 2004, provisional application No. 60/553,272, filed on Mar. 15, 2004, provisional application No. 60/553,471, filed on Mar. 16, 2004.

(51) Int. Cl.
*G06F 9/44* (2006.01)
*G06F 3/048* (2006.01)
*G06F 3/00* (2006.01)

(52) U.S. Cl. .................. 717/105; 717/104; 717/109; 715/730; 715/744; 715/762

(58) Field of Classification Search .................. None
See application file for complete search history.

(56) References Cited

U.S. PATENT DOCUMENTS

| | | | |
|---|---|---|---|
| 2004/0083199 A1* | 4/2004 | Govindugari et al. | 707/1 |
| 2004/0153992 A1* | 8/2004 | Molina-Moreno et al. | 717/105 |
| 2005/0125272 A1* | 6/2005 | Hostetler | 705/7 |
| 2005/0125438 A1* | 6/2005 | Krishnaswamy et al. | 707/102 |
| 2005/0204201 A1* | 9/2005 | Meenakshisundaram et al. | 714/38 |
| 2006/0265690 A1* | 11/2006 | Motoyama et al. | 717/117 |

* cited by examiner

*Primary Examiner*—Tuan Q Dam
*Assistant Examiner*—Isaac T Tecklu
(74) *Attorney, Agent, or Firm*—Prakash Nama; Global IP Services, PLLC

(57) ABSTRACT

A system monitors software development processes. In an embodiment, key components are identified in a requirements specification, verification rules are applied to delivered requirements, and entities is the requirements specification are validated. In another embodiment, a standard set of review types are generated, review checklists are generated, the review checklists are allocated, and review points are collected and tracked. In a further embodiment, a standard work break down structure and standard work products are defined, a high level plan is formed, and a planning template is formed. In another embodiment, the planning and tracking of a software development process and software product quality are stored in an integrated system, work products are reviewed, defects in the work products are recorded, and any defects are tracked until the completion of the software development process.

15 Claims, 8 Drawing Sheets

Project: [BOEING ▼]  Component: [Aircraft History (BesAcHist) ▼]

1: Controls without BTSynonymn

2: Controls Whose Synonyms are Greater Than 31 Characters

2: Published controls and Subscribed controls with different BTs

3: Published controls not subscribed – Not yet implemented

210 — 4: Activity with More than one Entry Point / Main / Main Modify / View Type ILBOs 220 — 5: ILBO Having combo but without Initialized Task 230 — 6: ILBO Without Combo but with initialize Task 240 — 7: Activity without tasks 8: Activity with ILBOs
Activity
Integration Services 9: ILBOs with Synonyms Repeated 10: ILBOs with Enumerated BTSynonyms Repeated

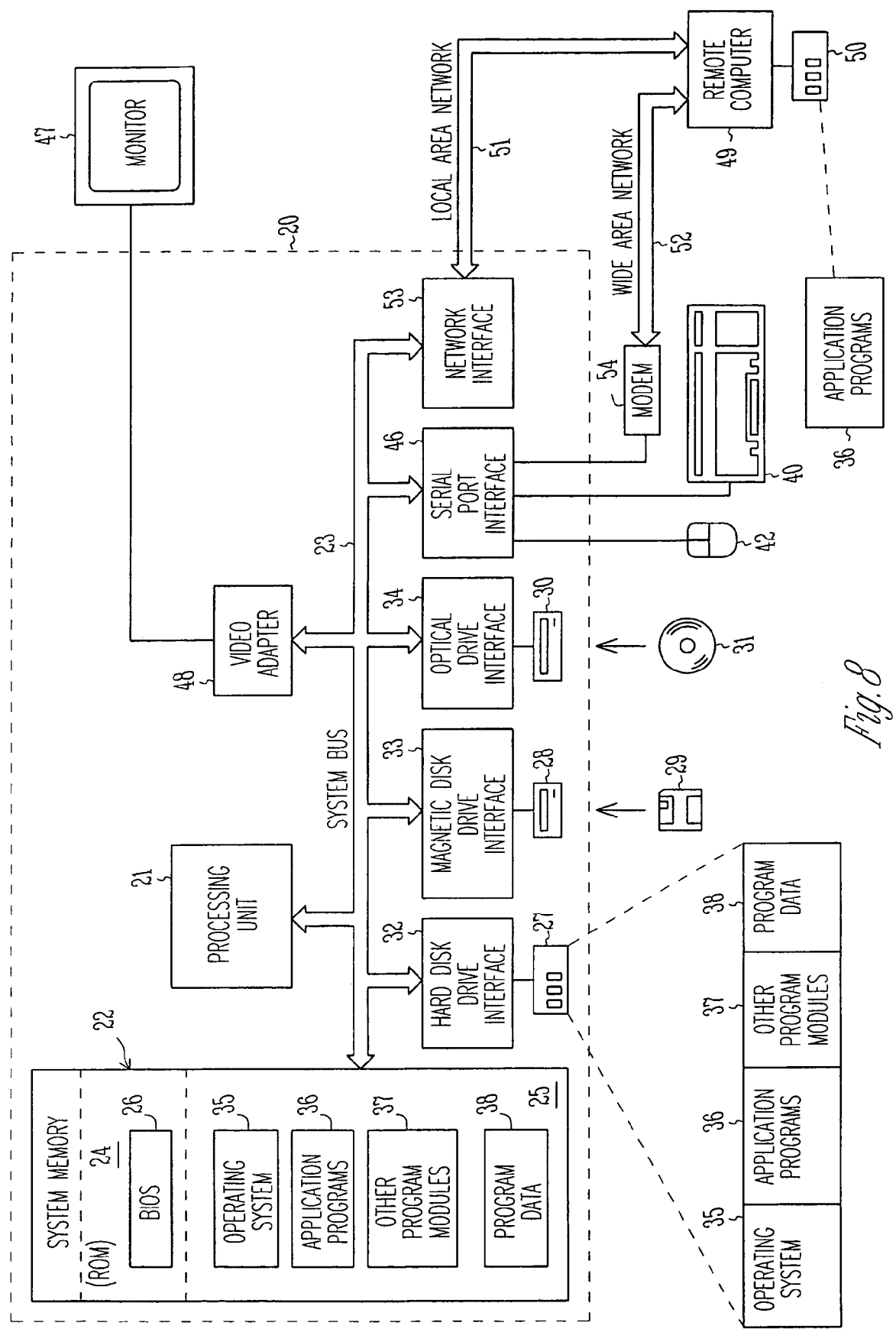

SYSTEM FOR MEASURING, CONTROLLING, AND VALIDATING SOFTWARE DEVELOPMENT PROJECTS

RELATED APPLICATIONS

Benefit is claimed under 35 U.S.C. 119(e) to U.S. Provisional Application Ser. No. 60/553,463, entitled "Approach for Integrated Software Metrics for Effective Process Improvement Initiatives" by inventor Sundararajan Parthasarathy et al., filed Mar. 16, 2004, which is herein incorporated in its entirety by reference for all purposes.

Benefit is claimed under 35 U.S.C. 119(e) to U.S. Provisional Application Ser. No. 60/553,270, entitled "Standardized Approach to Reviewing Software Applications" by inventor Raghuram Devalla et al., filed Mar. 15, 2004, which is herein incorporated in its entirety by reference for all purposes.

Benefit is claimed under 35 U.S.C. 119(e) to U.S. Provisional Application Ser. No. 60/553,272, entitled "Approach to Verification and Validation of Software Solution Specifications Across the Software Development Life Cycle" by inventor Srinivasan Ramaswamy et al., filed Mar. 15, 2004, which is herein incorporated in its entirety by reference for all purposes.

Benefit is claimed under 35 U.S.C. 119(e) to U.S. Provisional Application Ser. No. 60/553,471, entitled "Template Based Planning For Effective Monitoring And Controlling Software Projects" by inventor Srinivasan Ramaswamy et al., filed Mar. 16, 2004, which is herein incorporated in its entirety by reference for all purposes.

TECHNICAL FIELD

The present invention relates to software development life cycles, and in particular, monitoring software development life cycles.

BACKGROUND

Software development has three distinct stages—Requirements Specification, Design and Construction. The deliverables at each of these stages are crucial to the quality of the final deliverable provided to the customer. Unfortunately, in many development situations, the skill set of the people working in each of these phases may vary significantly. This variation increases the risk of a loss of specification particulars and other problems at the point of handover from one stage to another. Additionally, with the advent of the global economy, these stages may be handled by personnel in different geographic zones who speak different languages and dialects. This distribution of software development stages across geographic and cultural lines may create problems in the interpretation of the requirements, the design, and the construction of the software product.

Because of these potential problems, review management has become a major task in software development and delivery. Indeed, the quality of the final application depends in great part on the review mechanisms followed. Conventional review management consists in part of a set of standard document templates that directs personnel to manually conduct the review at pre-defined project milestones.

There are, however, problems associated with conventional review management. The review itself is normally guided by review checklists, but many times such checklists are not followed by the persons involved nor enforced by management. Additionally, the checklist itself is not standardized, leading to discretion among the reviewers for such things as exactly what should be delivered at what stage of the process. The conventional review management process therefore varies depending in part on the persons involved in the review process. Additional problems can arise when the reviewer and the project deliverables are not physically present at the place of the review.

In the past, the review process for a Requirements Specification has concentrated on the presentation and the functional content of the requirements. This has lead to situations where a reviewed Requirement Specification that is found functionally correct will lead to an incorrect design owing to various deficiencies that are more relevant to system design (that is, more relevant than the presentation and functional content of the Requirements Specification are to system design). And an incomplete Requirement Specification often goes unnoticed or untraceable until the system is delivered and implemented by the end user. Detecting insufficiencies of the requirements at this stage is very costly both in terms of elapsed time and project cost.

Similarly, the planning and effective execution of software projects may be hindered due to non-standard representation of work products and work break down structures (WBS). That is, different project teams may follow a different granularity for the definition of the work product, and further may follow different work break down structures in tune with the granularity differences of the work product. This may lead to confusion when reporting progress since not all groups follow common methods, and there is no linkage between the work products and their progression in the different stages of the software development. Consequently, project managers do not have a clear view on the progress of the project due to non-correlation of the planning parameters and the release parameters.

It is therefore desirable to collect metrics regarding the development and review of software projects. Unfortunately, all too often the metrics collection process happens as a separate activity, in a non-formalized and non-structured fashion, at the end of the project, and is not available for mid course corrections during project execution. There is also not a clear method for identifying points at which defects may be introduced.

BRIEF DESCRIPTION OF THE DRAWINGS

FIG. 2 illustrates an interface that may be used in connection with an embodiment of the invention that involves performing validations on a model.

FIG. 4 illustrates a user interface that may be used in connection with an embodiment of the invention that permits the recording of review observations.

FIG. 8 illustrates a computer system upon which an embodiment of the present invention may operate.

DETAILED DESCRIPTION OF AN EMBODIMENT

An embodiment of the invention addresses the shortcomings of the prior art by documenting review comments in a standard form and manner for ease of use and control. It uses a standardized approach to a review system and is driven by the system instead of the individual conducting the review. Standardized norms and templates for specifying software-engineering activities, estimating work product size, and estimating resource requirements are used. This information is used for managing the software project so that the project development conforms to the functional and quality requirements as specified.

Figure 1:
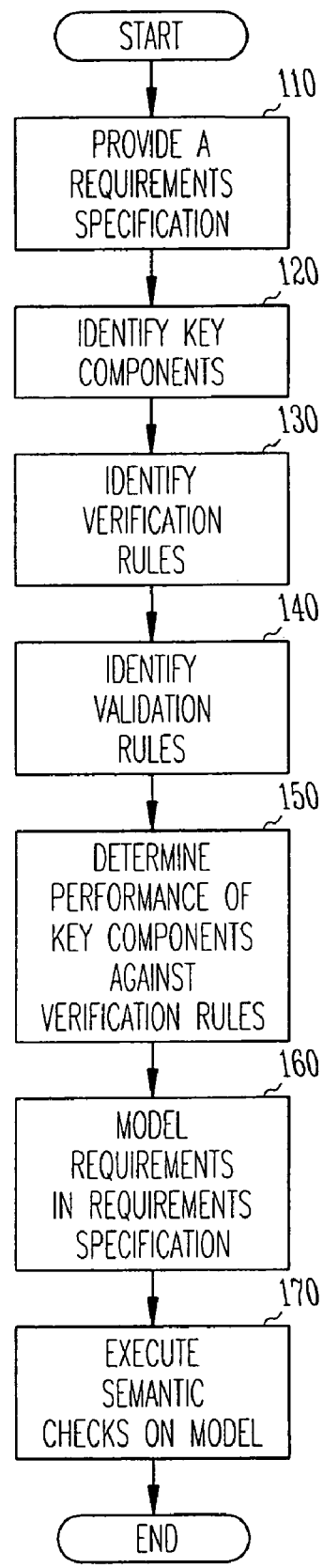
FIG. 1 is a flow chart of an embodiment of the invention.

In an embodiment of the invention, the inadequacies of prior art software review processes are addressed by validating and verifying the correctness of the Requirements Specification relating to its ability to translate from requirements into a design. The analysis involved in an embodiment of the invention illustrated in FIG. 1 involves identifying the key components (120) in the Requirements Specification (110) that impact the structure of the design (step 1), identifying the various verification rules that have to be applied to the delivered requirements (130) (step 2), and identifying the various validation rules that have to be validated across various entities in the requirements (140) (step 3).

In an embodiment, the validation analyzes each of the key components in the requirements for their performance against the verification rules as identified in Step 2. (150) Once all the key components are cleared for their verification rules, then the semantic checks that are involved between these key components are validated as identified in Step 3. The outcome of this validation is recorded as review points against the requirement deliverables and provided to the appropriate personnel for re-review. This process is repeated to ensure that there are no review points against the requirement deliverables, and at this stage, the requirement is accepted by design personnel for analyzing the details for implementation in the design.

This process, if executed manually however, would be very time consuming and strenuous. Therefore, in an embodiment, to efficiently implement this approach, the process is imbued with the ability to model the requirements in a manner that enables systemic implementation of the various checks (i.e. the validation analysis of each of the key components in the requirements for their performance against the verification rules, and the semantic checks between key components) as soon as the requirements are modeled. This provides a requirements specialist with an ability to add value by refining his Requirement Specification so that the specified system requirements can be translated into design with minimal transformation loss. Simply put, the various elements that form a part of a System Requirement are effectively captured in a model, and various checks are executed on this model. (160, 170)

Typical validations that may be performed on such a model include identifying:

User interface elements that do not have any display properties associated with them.

User interface elements whose properties do not satisfy the data type and naming requirements of their corresponding design elements.

User interface element data transfers specified between two user interface elements with different physical properties.

Data transfer requirements specified without any provider for these data elements.

User interface elements that have more than one entry point leading to ambiguity in resolution of the source on invocation.

User interface elements that need initialization but for which the Requirements Specification does not indicate any initialization points.

User interface initialization points that do not have associated with them any user interface elements that require such initialization.

An activity that does not have any description of the steps involved in performing the activity.

An activity that does not have any user interfaces that are required to perform the activity.

User interfaces that have similar user interface elements that may result in ambiguity during translation of user interface behavior in design.

User tasks that are specified but that do not have an association with any user interface elements.

User tasks that are identified but that do not have any business rules associated with them.

If any of the above issues surface, or any other validations, then the problem is corrected, the Requirements Specification re-reviewed, and then the requirements are turned over to the design stage. FIG. 2 illustrates an interface 200 that may be used in connection with the validations that may be performed on the model. For example, in FIG. 2, validations are indicated such as user interfaces that have more than one entry point (210), user interface elements that require initialization but for which there are no initialization points (220), initializations points that do not have associated with them user interface elements that require initialization (230), and an activity that does not have any description of the steps involved in performing the activity (240).

Figure 3:
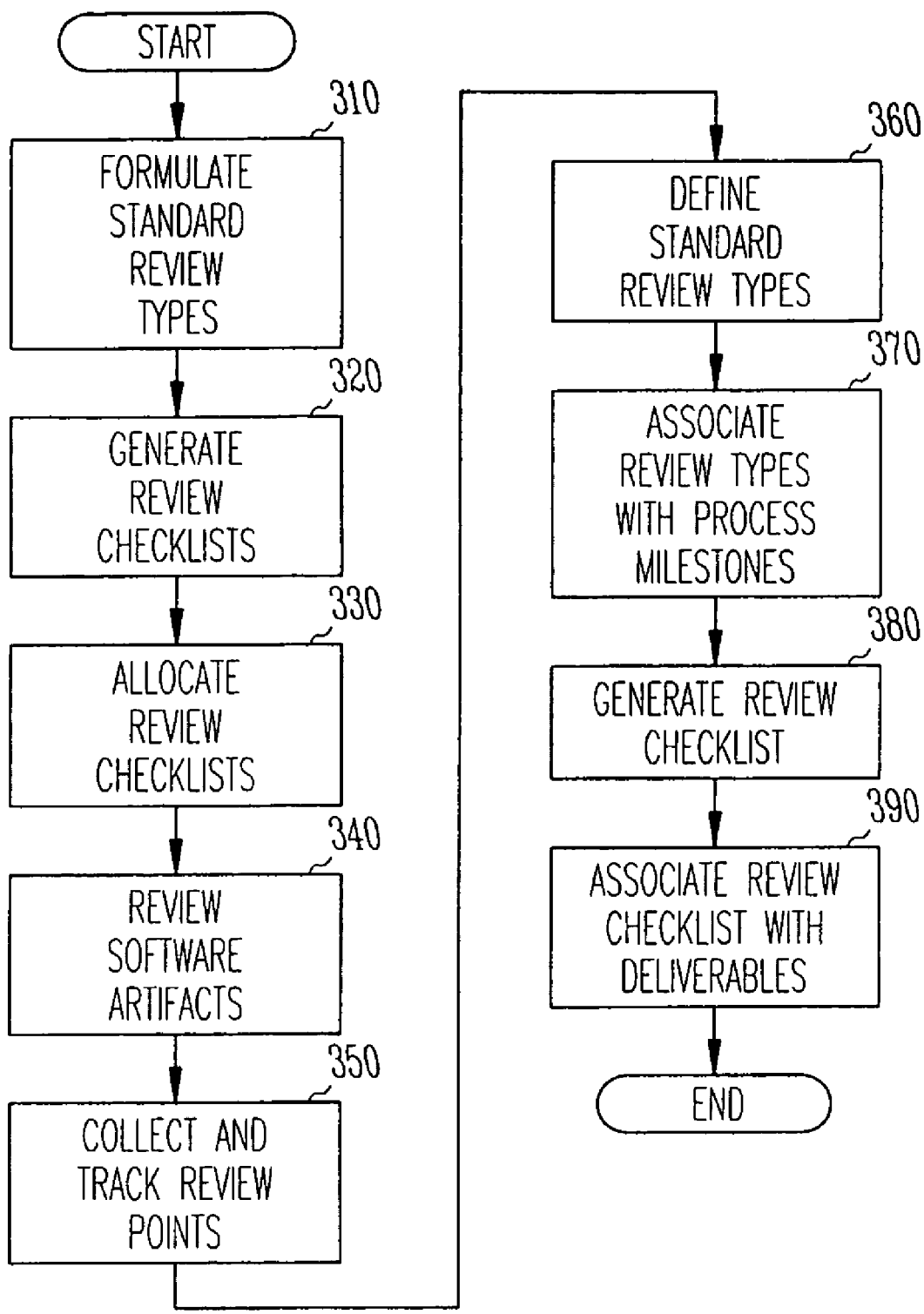
FIG. 3 is a flow chart of an embodiment of the invention.

In another embodiment, illustrated in FIG. 3, problems inherent with the use of standard document templates for use in review management of software are addressed. Specifically, in this embodiment, the review is driven by the system, not any particular individual. In this systemic approach, several factors are addressed and implemented. The system formulates a standard set of review types covering the complete development and delivery cycle. (310) Based on the review types, the system then arrives at the review checklists with the deliverables (320), and allocates review checklists to review resources. (330) The system provides a facility to review the software artifacts against the review checklist (340), and collects review points and tracks the review points for closing the review checklist. (350)

Figure 4:
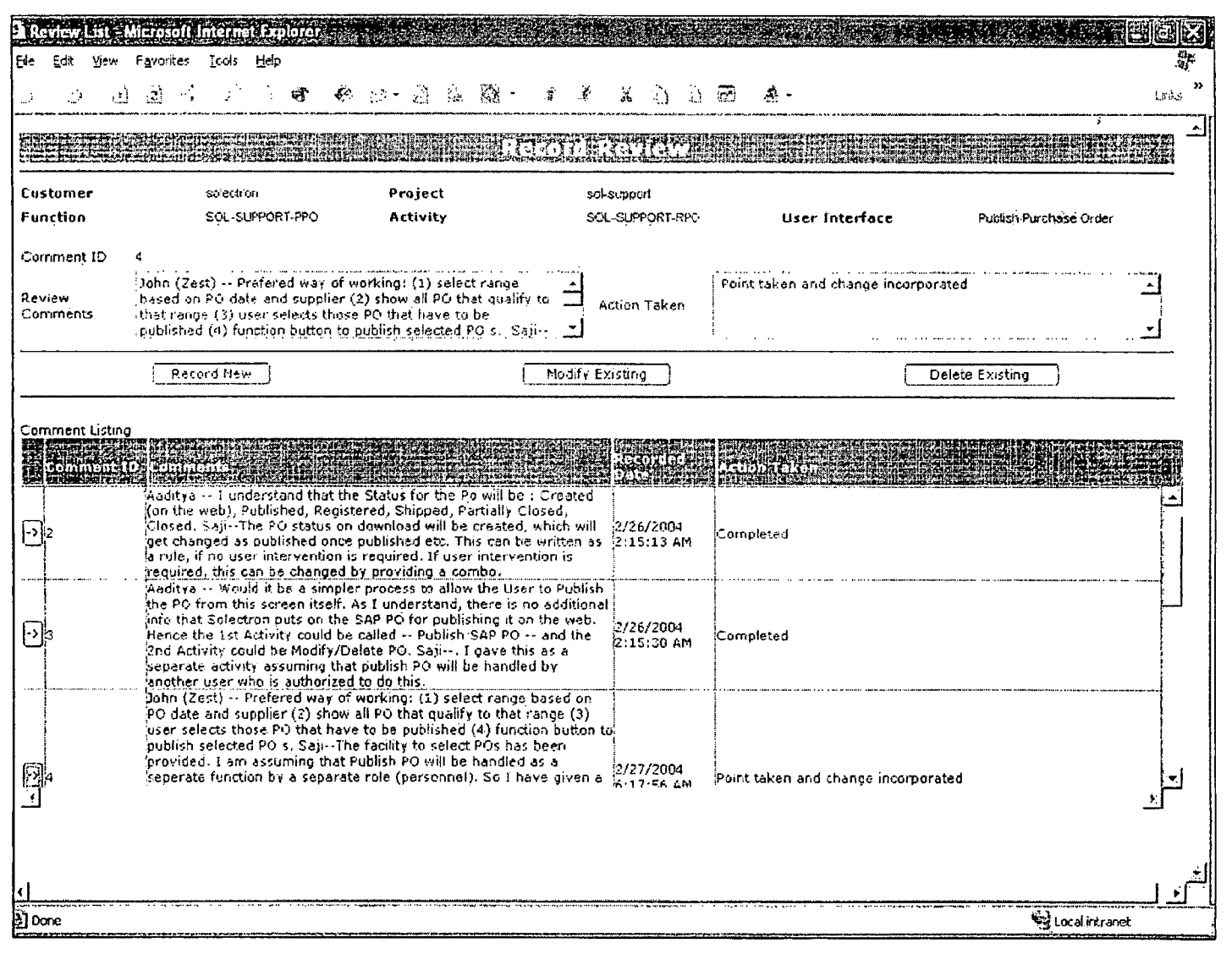

This embodiment of the invention addresses the above requirements with a standard approach for review management. A standard set of review types are defined (360) and associated with the process milestones (370) (e.g. requirements, design, testing, packaging and deployment). Each review type in-turn has a review checklist generated (380) and is associated with a set of deliverables arising at the process milestones. (390) The checklist and the deliverables are automatically derived based on the work product structure (WPS) held in the model. This ensures that the review is independent of the reviewer and all the deliverables are taken as part of the review activity and ensure completeness. While conducting the review, a facility may be provided to record the review observations as documentation. FIG. 4 illustrates an example of a user interface for such a facility.

There are several advantages to this embodiment of a review management system. First, it generates milestone-based review checklists for comprehensive review before proceeding to the subsequent stages. Second, it produces a record of review observations based on the review context for effective tracking and closure. Third, the review checklists are configurable based on the conduct of review, and the lists function as the guidelines for review against the deliverables.

Fourth, the system review may be performed over the Internet. And fifth, the review is independent of the individual reviewer which improves the quality of software applications.

Figure 5:
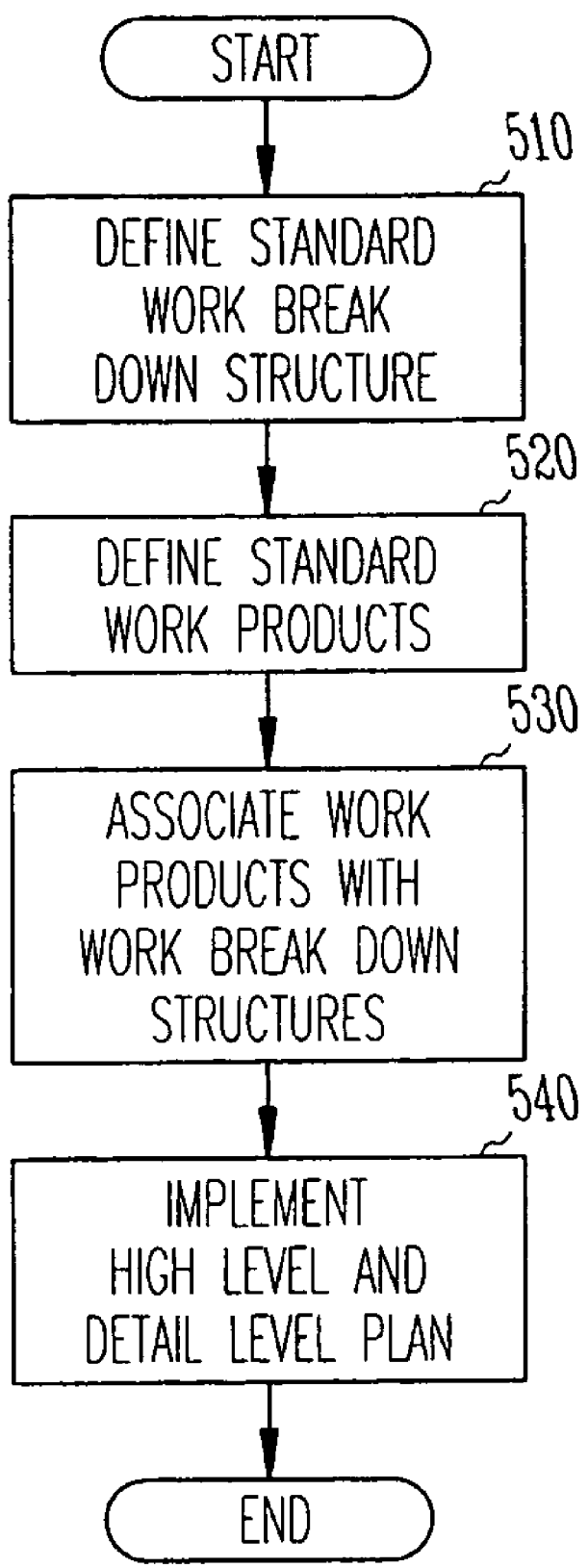
FIG. 5 is a flow chart of an embodiment of the invention.

In another embodiment of the invention, illustrated in FIG. 5, a template is used for the effective monitoring and control of software projects. This involves a definition of standard work break down structures (510) and standard work products (520) resulting in standard deliverables. These work break down structures and deliverables are associated with different granularities of context and are the same across different projects. Each such work product is associated with specific work break down structures (530) and this combination is used to drive first the high level planning, and then the detailed planning. (540) Since the work break down structure associated with the detailed planning has a semantic relationship with the work break down structure driving the high level planning, there is a strong link between a high level plan and a detailed level plan.

Specifically, in this embodiment, the work products are defined in a standardized hierarchy that include the following levels of granularity:

1. Release sets
2. Business Process Chains
3. Functions/Business Components
4. Activities/Menu entry points.

An example of a business process chain in the above hierarchy is order processing. Examples of functions in order processing include sales ordering, picking, and packing. Examples of activities in the function of sales orders include the authorization of a sales order and the creation of a sales order. There are also linear chain categories, which are a group of linear chains having the same end points in a process flow. Linear chains denote a particular path to reach a logical end point in a process chain.

The following table provides an example of a template of work break down structure elements (that are associated with detailed planning), and the hierarchy of the high level plan with which those break down structures are associated.

| Work Break down structure elements | Hierarchy level |
| --- | --- |
| Analyze plan item | Release set |
| Review of analyzed plan item | Release set |
| Prepare plan item concept document | LCC (Linear chain category) |
| Review of concept document | LCC |
| Establish prototype objectives (third party) | Component |
| Build/test/review proto review | Component |
| Summarize prototype activities | Component |
| Analyze component content | Component |
| Review component content | Component |
| Model component content | Activity |
| Review model component content | Activity |
| Analyze Business Rules | Activity |
| Review Business Rules | Activity |
| Model Business Rules | Activity |
| Review model Business Rules | Activity |
| OLH input/review | Activity |
| OLH | Activity |
| Analyze component requirements | Activity |
| Review component requirements analysis | Activity |
| Design presentation | Activity |
| Review presentation design | LCC |
| Design transactions | Activity |
| Review transaction design | Activity |
| Design physical schema | Component |
| Input & Review physical schema design | Component |
| Analyze component design | Activity |
| Review component design analysis | Activity |
| Construct presentation | Activity |
| Review presentation construction | Activity |
| Construct transactions | Activity |
| Review transaction construction | Activity |
| Prepare component test suite | Activity |
| Review component test suite | Activity |
| Test component | Component |
| Review component test results | Component |
| Prepare plan item test suite | BPC (Business process chain) |
| Review plan item test suite | BPC |
| Test plan item | BPC |
| Review plan item test results | BPC |
| Prepare release set test suite | Release set |
| Review release set test suite | Release set |
| Prepare test enterprise structure | Release set |
| Review test enterprise structure | Release set |
| Install release set | Release set |
| Test release set | Release set |
| Review release set test results | Release set |
| Prepare final test suite | Release set |
| Review final test suite | Release set |
| Reinstall release set | Release set |
| Execute final test | Release set |
| Review final test results | Release set |

In this embodiment, high level planning is only at the work break down structure level and is associated with specific project milestones. In the detailed planning of the project, work break down structure to work product structure mapping is done. While actual resources are assigned at this level to facilitate tracking the work, reassignments can also be performed. Scheduling and tracking can be done and also can be interfaced with standard project management tools. Since the work product structures are standard artifacts that have one to one correspondence to functional/business counterparts, traceability is made possible. Metrics collection is made possible in terms of rework.

Figure 6:
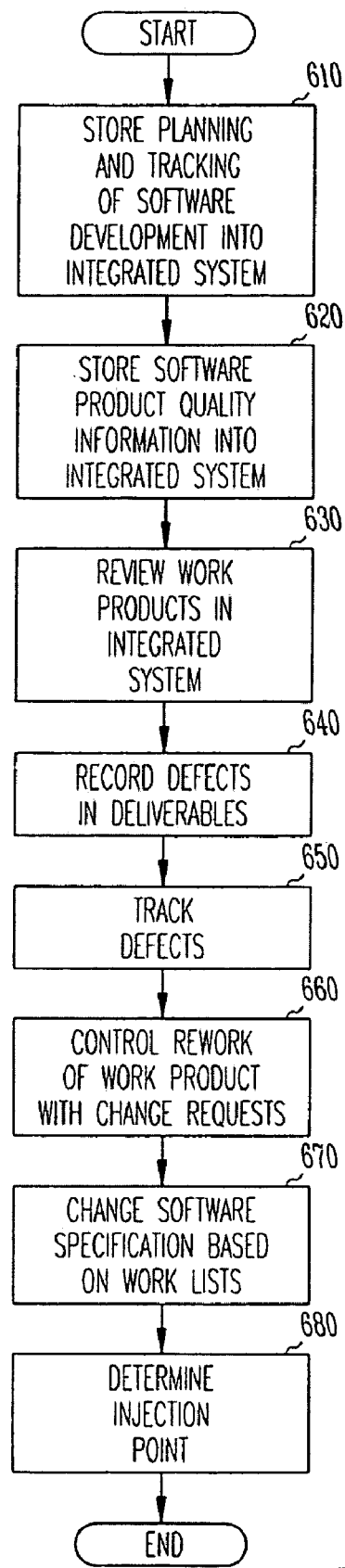
FIG. 6 is a flow chart of an embodiment of the invention.

In another embodiment, illustrated in FIG. 6, an integrated system holds all information regarding software product quality and the planning and tracking of the software development process. (610) In this embodiment, all work products are reviewed in a similar fashion, and any observation on a work product deliverable is considered a defect on the deliverable and is tracked through the closure of the project. This results in an integrated model for holding all project related planning and quality information. (620)

The integrated system supports the definition of all work products that are to be reviewed. (630) These work products are associated with different types of review mechanisms. The work product reaching a particular state in the system development life cycle triggers these reviews. Checks are in place to ensure that the subsequent stages are not initiated without the completion of mandated reviews. Each review is associated with checklists that need to be complied with. The review management system is tightly integrated with the software specification model and facilities are provided to navigate between the work product under review and the review management system.

All observations against a work product are automatically allocated and assigned to appropriate persons and any rework on the work product is controlled through change requests (660) and the changes to the software specifications are driven through work lists. (670) Since the changes are made on the specifications repository, it is possible to unambiguously determine injection points (i.e. location of defects).

(680) The time tracking system is integrated to allow booking of time only against allocated tasks, and it is therefore possible to get information on the status of a project at any time.

Having an integrated planning and tracking system provides information on both schedule variance and size variance on a near real time basis and assists in controlling the project more effectively. The system also provides information on product metrics like defect density, productivity and also review efficiency. This information is used for improving the process to ensure that quality software is delivered to a customer on time and within budget.

Figure 7:
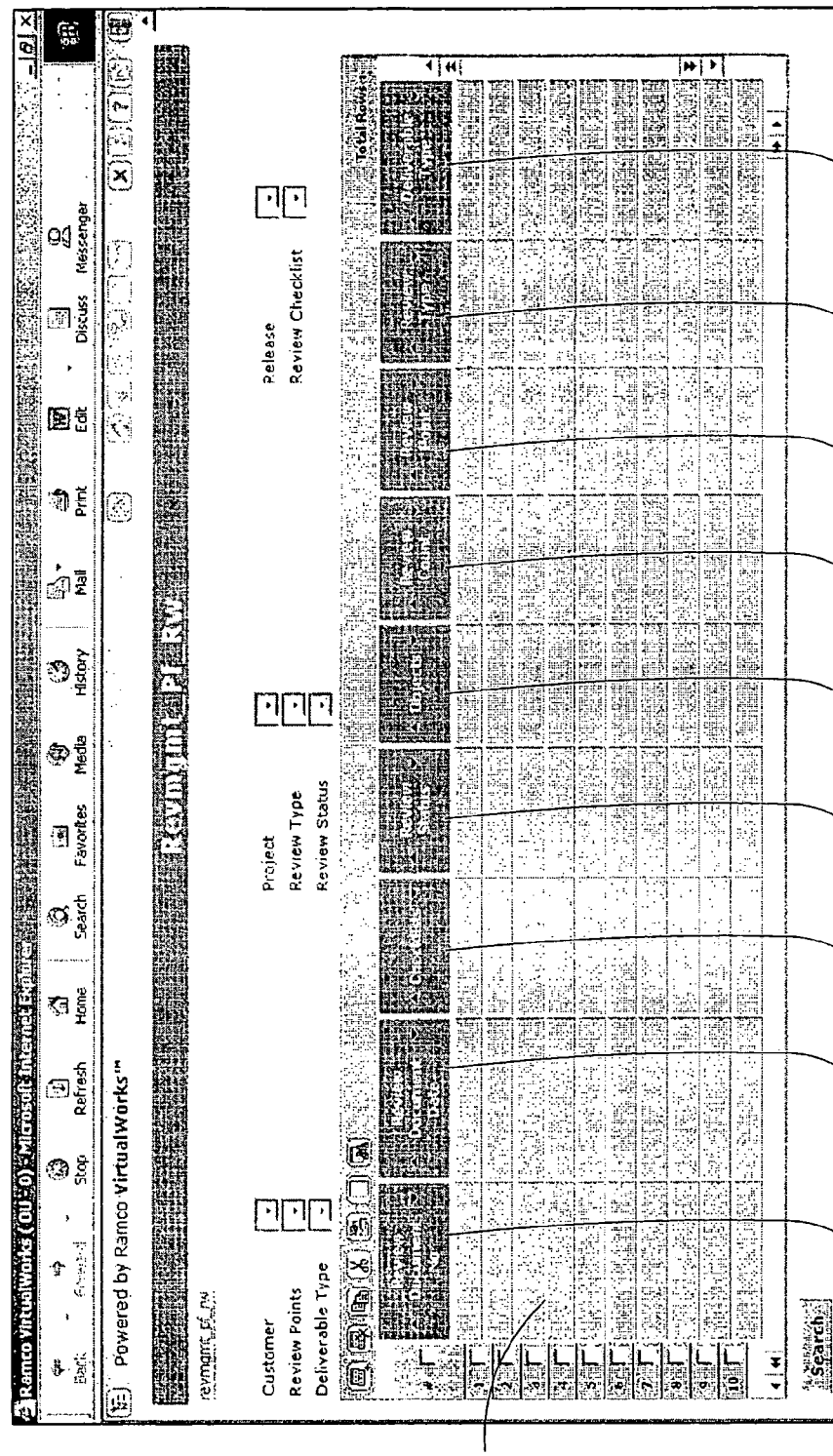
FIG. 7 illustrates a user interface that may be used in connection with an embodiment of the invention that tracks defects throughout the software development process.

In an embodiment, an integrated system is implemented as follows. First, all product quality and planning and tracking information are held within the integrated system, and all work products (Process, Function, Activity, Task, User interface and Business rules) under review are treated in a similar fashion. As disclosed above, an observation of a work product deliverable is considered as a defect and tracked through to the closure of the project. (640, 650) In conjunction with this, review management is tightly integrated with the software specification model, and all observations on a work product are automatically allocated and assigned to appropriate persons. Defect injection points, as one of the metrics, can be unambiguously determined from the specifications repository where changes are effected. An integrated time tracking system within the integrated system provides the status of the project over the timescale. Similarly, an integrated planning and tracking system within the integrated system provides information on schedule variance and size variance on a near real time basis. Product metrics like defect density, productivity and review efficiency can be taken from the review management system as inputs for improving the process on time and budget parameters. FIG. 7 illustrates a user interface that may be used in connection with the review management system of this embodiment. That is, the user interface 700 contains a spreadsheet 710 that allows personnel to determine the review document number 720, the review document date 725, the checklists 730, the review status 735, objects 740, the review count 745, the review point 750, the review type 755, and the deliverable type 760.

The integrated system of this embodiment provides for the availability of metrics information online for use at any time in the project, the removal of subjective elements while calculating metrics (because the system handles it through modeling), and a more accurate analysis across projects and teams. Consequently, in this embodiment metrics analysis is no longer relegated to a post mortem exercise, but rather is a mid course correction strategy. The information is integrated and consistent because it is produced by the system. This embodiment provides an integration between down stream processes like a defect tracking system (DTS) and up stream processes like planning systems.

FIG. 8 is an overview diagram of a hardware and operating environment in conjunction with which embodiments of the invention may be practiced. The description of FIG. 8 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 8, a hardware and operating environment is provided that is applicable to any of the servers and/or remote clients shown in the other Figure.

As shown in FIG. 8, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 8 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The invention claimed is:

1. A model-driven method, implemented in a computer, for validating a software development project, the method comprising:
   providing a requirements specification for the software development project;
   modeling key components in the requirements specification using the computer, wherein modeling the key components comprises defining hierarchical and linear relationships between various key components and associated software artifacts, and wherein the key components comprises processes, functions, activities, user interfaces, tasks and business rules;
   identifying verification rules that are applied to each of the key components in the modeled key components;
   identifying validation rules that are validated across each of the key components in said modeled key components, wherein said validation rules are used to analyze each of said key components in said modeled key components to determine the performance of said key components against said verification rules, and wherein said validation rules are used to validate semantic checks between said key components;
   generating review checklists based on the said identified validation rules for each of key components using the computer, and wherein generating the review checklists comprises associating said review checklists with a set of deliverables derived based on the modeled key components; and associating said review checklists with a set of deliverables at the software development project milestones, wherein said review checklists and said set of deliverables are automatically derived based on a modeled work products;
   allocating said review checklists to review resources;
   reviewing software artifacts of each work product against said review checklists and each project milestone by one of said review resources using the computer; and
   collecting and tracking review points for each software artifact of the work products; and
   executing, in the computer, the generated review checklists for validating the verification rules and the semantic checks on each of the modeled key components.

2. The method of claim 1, wherein said validation rules comprises:
   validating that user interface elements have display properties;
   validating that user interface elements have proper data types and naming requirements;
   validating that user interface element transfers have proper physical properties;
   validating that data transfers have an associated provider;
   validating that user interface elements have only one entry point;
   validating that user interface elements requiring initialization have initialization points;
   validating that user interface initialization points are associated with user interface elements that require initialization;
   validating that an activity has an associated description of steps;

validating that an activity has user interfaces to perform said activity;

validating that user tasks have associated user interface elements; and validating that user tasks have associated business rules.

3. A model-driven method, implemented in a computer, for monitoring and managing a software development project, the method comprising:

providing a requirements specification for the software development project;

modeling work products in the requirements specification using the computer, wherein modeling the work products comprises defining hierarchical and linear relationships between various work products and associated software artifacts, and wherein the work products comprises processes, functions, activities, user interfaces, tasks and business rules;

formulating a standard set of review types comprising a development and delivery life cycle, wherein said formulating comprises defining and identifying standard review types and associating said review types with software development project milestones, and wherein defining and identifying standard review types comprise:

identifying verification rules that are applied to each of the work products in the modeled work products;

identifying validation rules that are validated across each of the work products in said modeled work products, wherein said validation rules are used to analyze each of said work products in said modeled work products to determine the performance of said work products against said verification rules, and wherein said validation rules are used to validate semantic checks between said work products; and executing the identified validation rules for validating the verification rules and the semantic checks on the modeled work products;

generating review checklists based on the said standard review types and said identified validation rules for each of said work products using the computer, and further wherein generating the review checklists comprises associating said review checklists with a set of deliverables at the software development project milestones, wherein said review checklists and said set of deliverables are automatically derived based on the modeled work products;

allocating said review checklists to review resources;

reviewing software artifacts of each work product against said review checklists and each project milestone by one of said review resources using the computer; and collecting and tracking review points for each software artifact of the work products.

4. A model-driven method, implemented in a computer, for monitoring and managing a software development project comprising:

providing a requirements specification for the software development project;

modeling key components in the requirements specification using said computer, wherein modeling the key components comprises defining hierarchical and linear relationships between various key components and associated software artifacts, and wherein the key components comprises processes, functions, activities, user interfaces, tasks and business rules;

storing planning and tracking of a software development project, wherein planning and tracking of software development project comprise:

defining work products resulting in deliverables using said computer;

defining a standard work break down structure for each work product type using said computer;

forming a plan based on said work break down structure associated with one or more work products using said computer, wherein forming the plan comprises:

identifying verification rules that are applied to each of the work products in the modeled work products using said computer;

identifying validation rules that are validated across each of the work products in said modeled work products using said computer, wherein said validation rules are used to analyze each of said work products in said modeled work products to determine the performance of said work products against said verification rules, and wherein said validation rules are used to validate semantic checks between said work products;

executing the identified validation rules for validating the verification rules and the semantic checks on the modeled work products using said computer; and generating review checklists for each of said work products using said computer, and wherein generating the review checklists comprises associating said review checklists with a set of deliverables at software development project milestones, wherein said review checklists and said set of deliverables are automatically derived based on the modeled work products;

allocating said review checklists to review resources;

reviewing software artifacts of each work product against said review checklists and each project milestone by one of said review resources using the computer; and collecting and tracking review points for each software artifact of the work products; and assigning review resources to review the work products based on said plan using said computer; and tracking software development project milestones through said plan using said computer;

storing information regarding software product quality of the software development project based on said plan;

reviewing development of the work products for the stored software product quality by one of said review resources, wherein said review of said work products is triggered by said work products reaching a project milestone in development;

recording observations on deliverables of said work products as a defects;

tracking said defects until completion of said software development project;

controlling rework of the work products by identifying defects as change requests; and making changes to said work products based on said change requests.

5. The method of claim 4, wherein observations on said work products are automatically assigned and allocated to appropriate personnel, the method further comprising:

integrating a review management system with a software specification model;

navigating between said work products under review and said review management system; and determining an injection point in said review management system.

6. The method of claim 4, further comprising:

designing a detailed plan based on said plan;

associating said work break down structure with said detailed plan;

assigning resources to items in said detailed plan;

scheduling items for said assigned resources;

recording expended efforts for said assigned resources;

analyzing said expended efforts with reference to said detailed plan;

tracking project milestones through said detailed plan to generate management reports; and reviewing said management reports to identify project status;

whereby said work break down structure associated with said detailed plan has a semantic relationship with said work break down structure associated with said detailed plan.

7. A computer readable storage medium comprising instructions available thereon for executing a model-driven method, implemented in a computer, for validating a software development project, the method comprising:

providing a requirements specification for the software development project;

modeling key components in the requirements specification using the computer, wherein modeling the key components comprises defining hierarchical and linear relationships between various key components and associated software artifacts, and wherein the key components comprises processes, functions, activities, user interfaces, tasks and business rules;

identifying verification rules that are applied to each of the key components in the modeled key components;

identifying validation rules that are validated across each of the key components in said modeled key components, wherein said validation rules are used to analyze each of said key components in said modeled key components to determine the performance of said key components against said verification rules, and wherein said validation rules are used to validate semantic checks between said key components;

generating review checklists based on the said identified validation rules for each of key components using the computer, and wherein generating the review checklists comprises associating said review checklists with a set of deliverables derived based on the modeled key components; and associating said review checklists with a set of deliverables at the software development project milestones, wherein said review checklists and said set of deliverables are automatically derived based on a modeled work products;

allocating said review checklists to review resources;

reviewing software artifacts of each work product against said review checklists and each project milestone by one of said review resources using the computer; and collecting and tracking review points for each software artifact of the work products; and executing the generated review checklists for validating the verification rules and the semantic checks on each of the modeled key components.

8. The computer readable medium of claim 7, wherein said validation rules comprises:

validating that user interface elements have display properties;

validating that user interface elements have proper data types and naming requirements;

validating that user interface element transfers have proper physical properties;

validating that data transfers have an associated provider;

validating that user interface elements have only one entry point;

validating that user interface elements requiring initialization have initialization points;

validating that user interface initialization points are associated with user interface elements that require initialization;

validating that an activity has an associated description of steps;

validating that an activity has user interfaces to perform said activity;

validating that user tasks have associated user interface elements; and validating that user tasks have associated business rules.

9. A computer readable storage medium comprising instructions available thereon for executing a model-driven method, implemented in a computer, for monitoring and managing a software development project, the method comprising:

providing a requirements specification for the software development project;

modeling work products in the requirements specification using the computer, wherein modeling the work products comprises defining hierarchical and linear relationships between various work products and associated software artifacts, and wherein the work products comprises processes, functions, activities, user interfaces, tasks and business rules;

formulating a standard set of review types comprising a development and delivery life cycle, wherein said formulating comprises defining and identifying standard review types and associating said review types with software development project milestones, and wherein defining and identifying standard review types comprise:

identifying verification rules that are applied to each of the work products in the modeled work products;

identifying validation rules that are validated across each of the work products in said modeled work products, wherein said validation rules are used to analyze each of said work products in said modeled work products to determine the performance of said work products against said verification rules, and wherein said validation rules are used to validate semantic checks between said work products; and executing the identified validation rules for validating the verification rules and the semantic checks on the modeled work products;

generating review checklists based on the said standard review types for each of said work products using the computer, and further wherein generating review checklists comprises associating said review checklists with a set of deliverables at the software development project milestones, wherein said review checklists and said set of deliverables are automatically derived based on the modeled work products;

allocating said review checklists to review resources;

reviewing software artifacts of each work product against said review checklists and each project milestone by one of said review resources using the computer; and collecting and tracking review points for each software artifact of the work products.

10. A computer readable storage medium comprising instructions available thereon for executing a model-driven method, implemented in a computer, for monitoring and managing a software development project comprising:

providing a requirements specification for the software development project;

modeling key components in the requirements specification using said computer, wherein modeling the key components comprises defining hierarchical and linear relationships between various key components and associated software artifacts, and wherein the key components comprises processes, functions, activities, user interfaces, tasks and business rules;

storing planning and tracking of a software development project, wherein said planning and tracking of software development project comprise:

defining work products resulting in deliverables using said computer;

defining a standard work break down structure for each work product type using said computer;

forming a plan based on said work break down structure associated with one or more work products using said computer, wherein forming the plan comprises:

identifying verification rules that are applied to each of the work products in the modeled work products;

identifying validation rules that are validated across each of the work products in said modeled work products, wherein said validation rules are used to analyze each of said work products in said modeled work products to determine the performance of said work products against said verification rules, and wherein said validation rules are used to validate semantic checks between said work products;

executing the identified validation rules for validating the verification rules and the semantic checks on the modeled work products; and generating review checklists for each of said work products, and wherein generating the review checklists comprises associating said review checklists with a set of deliverables at software development project milestones, wherein said review checklists and said set of deliverables are automatically derived based on the modeled work products;

allocating said review checklists to review resources;

reviewing software artifacts of each work product against said review checklists and each project milestone by one of said review resources using the computer; and collecting and tracking review points for each software artifact of the work products;

assigning review resources to review the work products based on said plan using said computer; and tracking the software development project milestones through said plan using said computer;

storing information regarding software product quality of the software development project based on said plan;

reviewing development of the work products for the stored software product quality by one of said review resources, wherein said review of said work products is triggered by said work products reaching a project milestone in development;

recording observations on deliverables of said work products as defects;

tracking said defects until completion of said software development project;

controlling rework of the work products by identifying defects as change requests; and making changes to said work products based on said change requests.

11. The computer readable medium of claim 10, wherein observations on said work products are automatically assigned and allocated to appropriate personnel, the method further comprising:

integrating a review management system with a software specification model;

navigating between said work products under review and said review management system; and determining an injection point in said review management system.

12. The method of claim 10, further comprising:

designing a detailed plan based on said plan;

associating said work break down structure with said detailed plan;

assigning resources to items in said detailed plan;

scheduling items for said assigned resources;

recording expended efforts for said assigned resources;

analyzing said expended efforts with reference to said detailed plan;

tracking project milestones through said detailed plan to generate management reports; and reviewing said management reports to identify project status;

whereby said work break down structure associated with said detailed plan has a semantic relationship with said work break down structure associated with said detailed plan.

13. An apparatus validating a software development project, comprising:

a computing device;

a display device coupled to the computing device; and memory coupled to the computing device for storing instructions, when executed by the processor, causes the processor to perform a method comprising:

providing a requirements specification for the software development project to the computing device;

modeling key components in the requirements specification using the computing device and the display device, wherein modeling the key components comprises defining hierarchical and linear relationships between various key components and associated software artifacts, and wherein the key components comprises processes, functions, activities, user interfaces, tasks and business rules;

identifying verification rules that are applied to each of the key components in the modeled key components using the computing device and the display device;

identifying validation rules that are validated across each of the key components in said modeled key components using the computing device and the display device, wherein said validation rules are used to analyze each of said key components in said modeled key components to determine the performance of said key components against said verification rules, and wherein said validation rules are used to validate semantic checks between said key components;

generating review checklists based on the said identified validation rules for each of key components using the computing device and the display device, and wherein generating the review checklists comprises associating said review checklists with a set of deliverables derived based on the modeled key components; and further wherein generating the review checklists comprises associating said review checklists with a set of deliverables at the software development project milestones, wherein said review checklists and said set of deliverables are automatically derived based on the modeled work products;
allocating said review checklists to review resources;
reviewing software artifacts of each work product against said review checklists and each project milestone by one of said review resources using the computer; and
collecting and tracking review points for each software artifact of the work products; and
executing the generated review checklists for validating the verification rules and the semantic checks on each of the modeled key components using the computing device and the display device.

14. An apparatus for monitoring and managing a software development project, comprising:
a computing device;
a display device coupled to the computing device; and
memory coupled to the computing device for storing instructions, when executed by the processor, causes the processor to perform a method comprising:
providing a requirements specification for the software development project;
modeling work products in said requirements specification via said computing device, wherein said modeling work products comprises defining hierarchical and linear relationships between various work products and associated software artifacts, and wherein said work products comprises processes, functions, activities, user interfaces, tasks and business rules;
formulating a standard set of review types comprising a development and delivery life cycle using said computing device, wherein said formulating comprises defining and identifying standard review types and associating said review types with software development project milestones, and wherein said defining and identifying standard review types comprise:
identifying verification rules that are applied to each of the work products in the modeled work products using the computing device and the display device;
identifying validation rules that are validated across each of the work products in said modeled work products using the computing device and the display device, wherein said validation rules are used to analyze each of said work products in said modeled work products to determine the performance of said work products against said verification rules, and wherein said validation rules are used to validate semantic checks between said work products; and
executing the identified validation rules for validating the verification rules and the semantic checks on the modeled work products using the computing device and the display device;
generating review checklists based on said review types for each work product by using said computing device, and further wherein generating review checklists comprises associating said review checklists with a set of deliverables at said software development project milestones, wherein said review checklists and said set of deliverables are automatically derived based on said modeling work products;
allocating said review checklists to review resources using said computing device;
reviewing software artifacts of each work product against said review checklists and each project milestone by a review resource using said display device and said computing device; and
collecting and tracking review points for each software artifact of work product using said computing device.

15. An apparatus for monitoring and managing a software development project, comprising:
a computing device;
a display device coupled to the computing device; and
memory coupled to the computing device for storing instructions, when executed by the processor, causes the processor to perform a method comprising:
providing a requirements specification for the software development process via said display device;
modeling work products in said requirements specification using said computing device and said display device, wherein said modeling work products comprises defining hierarchical and linear relationships between various work products and associated software artifacts, and wherein said work products comprises processes, functions, activities, user interfaces, tasks and business rules;
storing process steps of planning and tracking of the software development project in said memory, wherein said process steps of planning and tracking of software development project comprise:
defining work products resulting in deliverables using said computing device and said display device;
defining a standard work break down structure for each work product type using said computing device and said display device;
forming a plan based on said work break down structure associated with one or more work products using said computing device and said display device, wherein forming the plan comprises:
identifying verification rules that are applied to each of the work products in the modeled work products using the computing device and the display device;
identifying validation rules that are validated across each of the work products in said modeled work products using the computing device and the display device, wherein said validation rules are used to analyze each of said work products in said modeled work products to determine the performance of said work products against said verification rules, and wherein said validation rules are used to validate semantic checks between said work products;
executing the identified validation rules for validating the verification rules and the semantic checks on the modeled work products using the computing device and the display device; and
generating review checklists for each of said work products using said computing device, and wherein generating the review checklists comprises associating said review checklists with a set of deliverables at software development project milestones, wherein said review checklists and said set of deliverables are automatically derived based on the modeled work products;
assigning review resources to review the work products based on said plan using said computing device and said display device; and
allocating said review checklists to review resources;
reviewing software artifacts of each work product against said review checklists and each project milestone by one of said review resources using the computer; and collecting and tracking review points for each software artifact of the work products;

tracking the software development project milestones through said plan using said computing device and said display device;

storing information regarding software product quality in said computer memory;

reviewing development of work products for said software product quality based on said plan by one of said review resources using said computing device and said display device, wherein said review of said work products is triggered by said work products reaching a project milestone in development;

recording observations on deliverables of said work products as a defects in said computer memory;

tracking said defects until completion of said software development project using said computing device and said display device;

controlling rework of said work products by identifying defects change requests using said computing device; and making changes to work products based on said change requests using said computing device.

* * * * *